Feb. 23, 1926.

R. C. BRADLEY 1,574,338

FLUID METER

Filed June 12, 1920

Inventor
Richard Clinton Bradley
By attorney

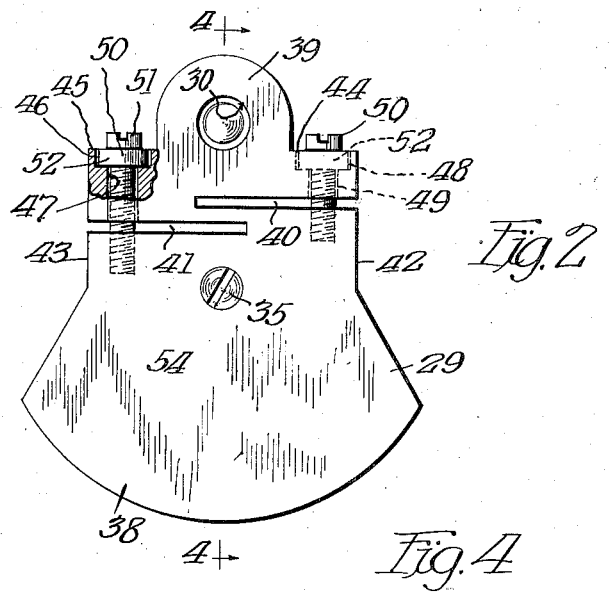
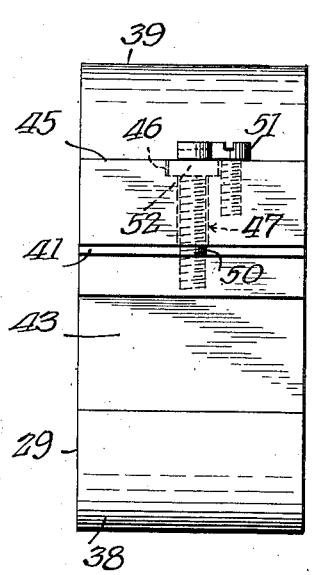
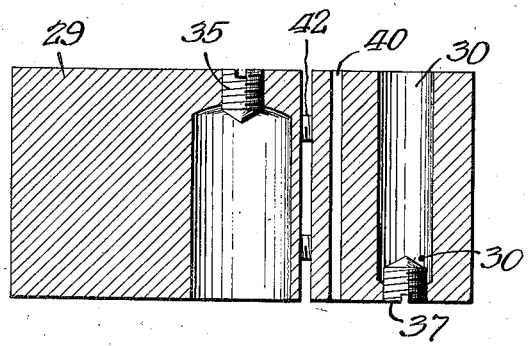
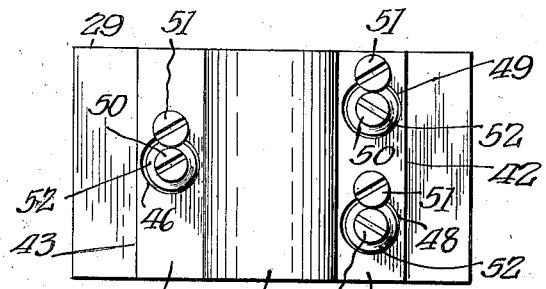

Patented Feb. 23, 1926.

1,574,338

UNITED STATES PATENT OFFICE.

RICHARD CLINTON BRADLEY, OF CHICAGO, ILLINOIS, ASSIGNOR TO S. F. BOWSER AND COMPANY, INCORPORATED, OF FORT WAYNE, INDIANA, A CORPORATION.

FLUID METER.

Application filed June 12, 1920. Serial No. 388,439.

*To all whom it may concern:*

Be it known that I, RICHARD CLINTON BRADLEY, a citizen of the United States, and a resident of Chicago, Cook County, Illinois, have invented certain new and useful Improvements in Fluid Meters, of which the following is a specification.

My present invention relates in general to measuring instruments, and more particularly to fluid meters, and has special reference to the provision of an improved device of the character referred to wherein motion is imparted to an element by the flow of water and the movement of which element is in turn used to measure the volume of the flow.

These measuring instruments comprise a great number of movable elements, one acting upon the other from the point of fluid flow to the point of visual indication. It is obvious that it is impossible to machine all of these many parts to an absolute certainty or maintain them in exact adjustment and inaccuracies in machining and adjustment which would be considered ordinarily as negligible will have a decided misleading effect, when multiplied many times as in a continuously operated measuring device. Furthermore, as the parts which are subject to long continued use begin to wear, their inaccuracies will increase and the instrument will register slow or fast.

Another objection generally found with water meters now in use is as the parts grind on each other, noises due to friction will be produced, which will be made still more objectionable as the parts begin to wear and work loose, thus setting up chattering noises.

The principal objects of my present invention are the provision of means whereby wearing friction is largely minimized; the provision of means for making an original close adjustment for the sake of accuracy; the provision of means for compensation for wear as it takes place; the provision of a meter structure adapted for ready disassembly whereby the parts may be cleaned, adjusted, repaired or replaced, and the meter structure reassembled without disturbance of the associated piping; the provision of a meter characterized by a high degree of sensitiveness to fluid flow; the provision of an improved form of bearing support; together with such further and additional objects as may hereinafter appear.

In devices of the character referred to, the measuring element is adapted to be subjected continually to fluid, and to respond to a fluid flow which may be continuous.

In devices of the present class, the desired primary adjustment is attained by so varying the interaction of the water flow and the element moved thereby, as to vary the action of the water upon the element and in the specific embodiment shown this is done by making provision whereby the moving element can be shifted either backward or forward to provide for any desired adjustment.

While the present invention is applicable to meters of various types, and in fact to other kinds of measuring instruments, it is particularly adapted for embodiment in so-called oscillating meters wherein an annular measuring chamber is provided with a hollow cylindrical piston having an eccentric movement combined with a movement of oscillation within said chamber, such meters being known to the trade as the "Empire" type.

In the "Empire" type of meter the piston is provided with transverse web, the center of which is constrained to revolve through a circular orbit concentric with the walls of the measuring chamber. To guide the center of the piston in its movement of revolution one feature of the present invention consists in mounting of the piston upon an eccentric pivot bearing in a bearing block that is, in turn, mounted for concentric rotation relatively to the measuring chamber. The invention also contemplates the mounting of said bearing block upon a fixed pivot bearing.

In accordance with another feature of the present invention, provision is made for the shifting of the central portion of the piston toward and from the center of the bearing block, or, in other words, for varying the relative spacing of the pivot bearings for the piston and the bearing block, for the purpose of facilitating accuracy in the initial positioning of the piston and bearing block bearings and for permitting subsequent relative adjustment of said bearings to compensate for wear or other varying conditions of use.

The invention further consists in certain other features of construction, combinations and arrangements of parts hereinafter described and claimed, the advantages of which will be obvious to those skilled in the art.

In the accompanying drawing,

Figure 2 is a plan view of the bearing block;

Figure 3 is a lateral view of the block of Figure 2 viewing it at a right angle to the position there shown;

Figure 4 is a sectional view taken on the line 4—4 of Figure 2; and

Figure 5 is an end view of the block of Figure 2.

Figure 1:
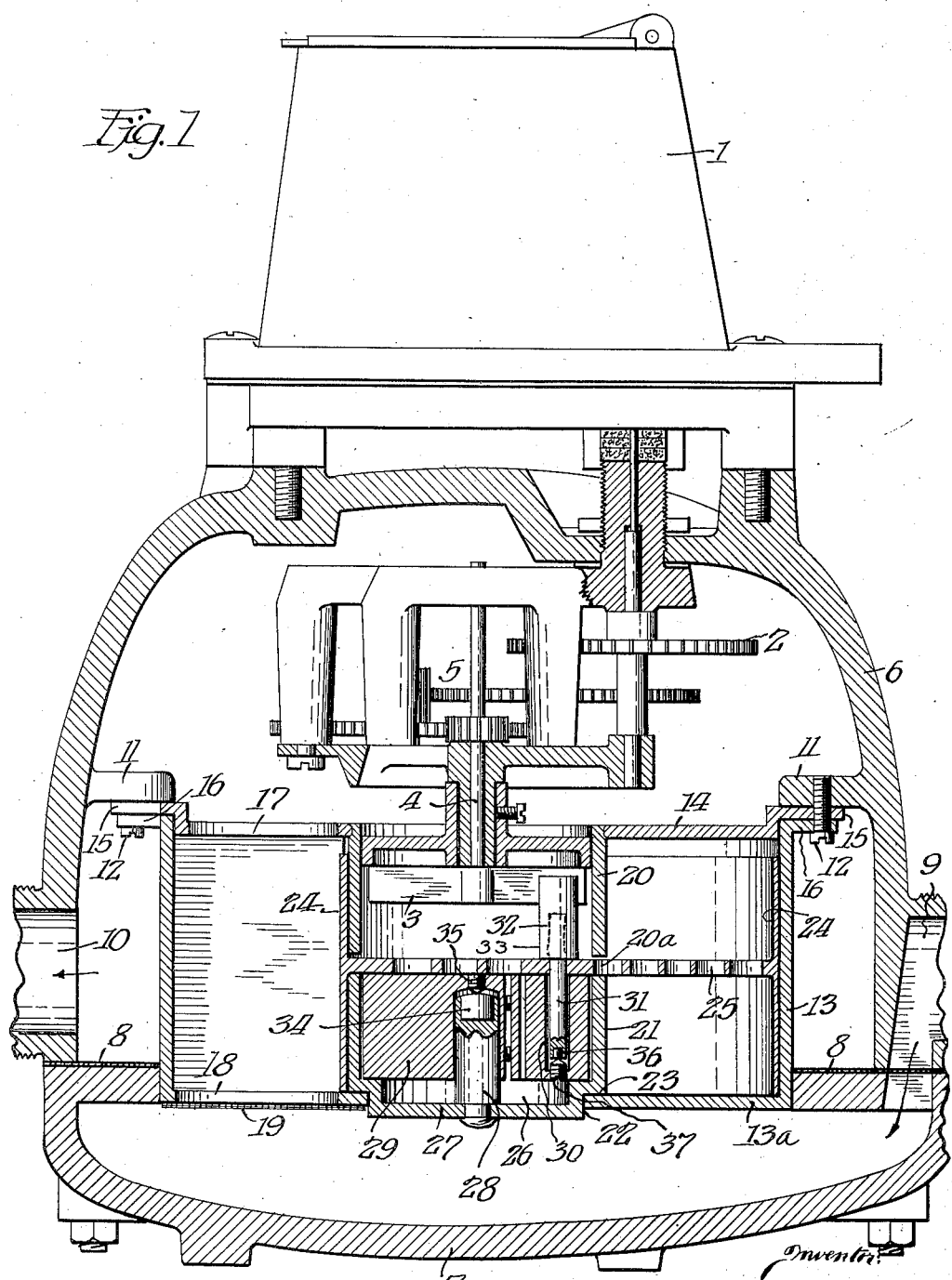
Figure 1 is a vertical elevational view taken centrally through the meter structure.

Viewing first Figure 1 of the drawing it will be observed that I have here shown a structure comprising a case, 1, for the dial mechanism, operated to register by the intermediate gearing, indicated generally at 2, rotated by the crank arm, 3, through the shaft, 4, in the manner presently to be described.

The intermediate gearing, 5, as well as the measuring chamber are enclosed within a casing consisting of the upper part, 6, and the base, 7, the two being secured together in any desired manner, such as by the bolts shown. A gasket, 8, is provided between the two to make the casing water-tight.

The casing, preferably the upper part 6, is provided with the spuds 9 and 10, one forming a water inlet and the other a water outlet. By this arrangement the base 7 may serve as a settling chamber.

Supported from the flange, 11, formed on the inner side of the upper part 6 of the outer casing, by the supporting means, 12, is the cylindrical inner case, 13, and its cover member, 14. Both of these elements 13 and 14 are provided with laterally extending overlapping flanges 15 and 16, to receive the securing and supporting means 12. By this arrangement it will be seen that both parts of the inner casing are supported by a single set of supporting means, and that the contents are securely disposed in predetermined relation.

The cover member, 14, and the bottom head, 13ª, of this inner case are provided with openings 17 and 18, respectively, to permit of the flow of water through the measuring chamber, the lower opening, 18, being provided with a strainer, 19, to keep out extraneous matter, such as sediments, etc. The cover member, 14, of the inner case is provided with a concentric opening from which is dependingly supported, in any desired manner, the cylindrical wall, 20, the function of which will shortly be described. The bottom head, 13ª, is similarly provided with a concentric opening in which seats the cylindrical member 21 reduced as at 22 to provide the seating portion 23.

Both the internal diameter and the external diameter of the cylindrical members 20 and 21 are preferably exactly alike so that they in fact form a continuous internal cylindrical chamber or bearing member, and an external cylindrical bearing member. It will be noticed, however, that the lower end of the member 20 is spaced from the lower member 21, the space 20ª thus formed being provided to receive the diaphragm of the piston now to be described.

Mounted within the inner cylindrical case, 13, is the hollow cylindrical piston element, 24, the diameter of which is considerably smaller than that of the inner cylindrical case, 13. The piston, 24, is provided substantially midway between its top and bottom with the transverse support or perforated diaphragm 25. The piston, 24, is carried in the inner case, 13, with its diaphragm, 25, in the space 20ª. The thickness of the diaphragm is less than that of the width of the space 20ª so as to permit the piston to float in the case 13. This piston is acted on by the water and moved for measuring purposes in the manner customary in this type of water meter.

The chamber, 26, formed within the cylindrical casing, 21, is the bearing chamber and extending upwardly from the bottom, 27, thereof is the central post, 28, which forms the main pivot for the bearing block member, 29, to be described in more detail hereafter.

This bearing block member, 29, is concentrically mounted upon the post, 28, for rotation, the inner surface of the cylindrical member, 21, and the contact upper surface of the seating portion, 23, forming a bearing surface for this member, 29. The member, 29, is recessed at a point removed from its pivot to form the bearing, 30, in which is received the lower reduced end, 31, of a bearing pin, 32.

This pin 32 extends through and fits tightly within a central perforation in the piston 25, and an enlarged portion 33 is mounted on the upper end of the pin, or it may be formed integral therewith, to contact with and operate the crank arm 3 to cause the registering mechanism to operate.

From the foregoing description it is apparent that as the piston, 25, is acted upon by the flow, the bearing member, 29, will be caused to move about the pivot post, 28, which will in turn cause the bearing, 30, to move bodily about the post, 28, and concentrically thereto. The tendency toward wear on these two points of pivotal mounting is considerable. The post, 28, is therefore provided with an insert 34 made of a hard, wear resisting material, preferably a jewel, and the bearing member, 29, is provided with the pointed pivot supporting member, 35, made preferably of hardened steel. As a result of this arrangement, a pivotal support for the bearing member, 29, is provided, wherein friction is largely reduced and tendency to wear consequently diminished.

It will be noted that the pivot post 28 and the bearing pin 32 are both movably received within corresponding openings in the bearing block which are deep relatively to their diameters and positively stabilize the movement of the piston 24 relatively to said pivot post and the bearing block.

The journal bearing construction, 30, 32, is similarly provided with a jewelled bearing insert, 36, and a hardened steel pivotal supporting member, 37.

Now viewing more particularly Figs. 3 to 5 inclusive, in which is illustrated the bearing block member, 29, on an enlarged scale, it will be noticed that this member is curved at the end, 38, concentrically with its pivotal support 35.

At the opposite end, the member. 29, is provided with a lobe, 39. The distance across from the end of the lobe, 39, to the surface, 38, is such that the bearing member, 29, has a loose fit in the cylindrical member 21.

For varying its action, this member, 29, is provided intermediate of its ends with the two cuts 40 and 41 positioned between the bearing members 30 and 35. These cuts are made inwardly from the opposed surfaces 42 and 43 and are preferably at right angles to a median line joining the bearing members, 30, 35, and each cut in addition extends inwardly to a distance substantially beyond such line joining the members, 30, 35. These cuts, 40, 41, thus overlap and are preferably substantially parallel for a considerable distance.

The member, 29, is further provided with the straight end surfaces, 44 and 45, the surface 45 being recessed intermediate its ends at 46 to form a socket, and the recess 46 being further reduced as at 47. The end surface, 44, is similarly recessed at two spaced apart points, 48 and 49 (see Figure 5). The recess, 47, crosses and extends beyond the cut, 41, and the recesses 49 cross and extend beyond the cut 40.

That portion of these three recesses which extends inwardly of the cuts 40 and 41 is still further reduced in size and screw threaded, the rest of these recesses being unthreaded.

Loosely received in the unthreaded part of each of these recesses, and threaded into the screw threaded part of each extending beyond the cuts, are the machine screws, 50, having enlarged heads, 52, resting in the sockets, 46, 48. Such screws, 50 may be locked in position by the lock screws, 51.

By providing the cuts, 40 and 41, as described, the member, 29, is made up of two parts, one the solid part, 54, in which, is the pivot 35, and the lobe portion, 39, in which is formed the pivot member, 30. The lobe portion is, as a result of the cuts 40 and 41, connected to the main portion, 54, for adjustment toward and away from said main portion, both longitudinally and laterally.

For example by threading the screws, 50, inwardly it is obvious that the lobe portion, 39, will be moved inwardly. As a result of the stated adjustment for example, the pivot member, 30, and with it the shaft, 32 will be shifted toward the center post, 28. This in turn will carry with it the piston element, 25, and in this way the action of the water upon the piston changed so that the piston will either move faster or slower, depending upon the direction in which the screws, 50, are severally turned.

Such variation will obviously vary the relation of the portion 38 to the remainder of the bearing block 29, consequently varying the counterweighting action of such portion 38. This counterweighting action is a notable feature of the present invention inasmuch as the member 29 always moves in a direction opposite to that of the piston member 24 and serves to aid in balancing the operation of the device as a whole.

It will be noted that the cylindrical inner casing 13, cover 14, and cylindrical members, 20, may be formed out of stampings and the members 20 and 21 secured to the members 14 and 13 by swaging or riveting, and that the post 28 may also be riveted to the bottom of the member 21.

Having thus described my invention and illustrated its use, what I claim as new and desire to secure by Letters Patent is—

1. In a fluid meter, a casing provided with an inlet thereto and an outlet therefrom, fluid measuring means actuated by the flow of fluid, and means for changing the action of said measuring means comprising spaced pivot members for supporting said measuring means, and means whereby the spacing of said members may be varied.

2. In a fluid meter, a casing provided with an inlet thereto and an outlet therefrom, fluid measuring means actuated by the flow of water, and means for varying the action of said measuring means comprising two mountings for the measuring means relatively revoluble about each other.

3. In a fluid meter, a casing having an inlet and an outlet, fluid measuring means within said casing actuated by the flow of the fluid, and means for varying the action of said measuring means comprising a bearing member rotatable about an axis fixed relatively to the casing, and means for mounting said measuring means on said bearing member for eccentric oscillation thereon, said bearing means being adjustable to vary the relation of the axis of oscillation to said axis of rotation.

4. In a fluid meter, a casing having an inlet and an outlet, fluid measuring means within said casing actuated by the flow of the fluid, and means for varying the action of said measuring means comprising a bearing member rotatable about an axis fixed relatively to the casing, means for mounting said measuring means on said bearing member for eccentric oscillation thereon, said bearing means being adjustable to vary the relation of the axis of oscillation to said axis of rotation, and means for effecting such adjustment.

5. In a fluid meter, a piston, pivotal support therefor, said piston being mounted eccentrically of the pivot, and said support having means whereby the center of the piston may be moved towards and from the pivot.

6. In a liquid meter wherein an annular measuring chamber is provided with a hollow cylindrical piston having an eccentric movement combined with a movement of oscillation within said chamber, a bearing block mounted upon a pivot bearing for concentric rotation relatively to said chamber, and an eccentric bearing on said block for said piston, said bearing block having overlapping cuts extending inwardly from opposite sides and crossing the common plane of the axis of rotation of said block and the axis of oscillation of said piston whereby said block is capable of being flexed to vary the distance between said axes.

7. In a liquid meter wherein an annular measuring chamber is provided with a hollow cylindrical piston having an eccentric movement combined with a movement of oscillation within said chamber, a bearing block mounted upon a pivot bearing for concentric rotation relatively to said chamber, an eccentric bearing on said block for said piston, said bearing block having overlapping cuts extending inwardly from opposite sides and crossing the common plane of the axis of rotation of said block and the axis of oscillation of said piston whereby said block is capable of being flexed to vary the distance between said axes, and means for flexing said block and securing it in various positions of flexible adjustment.

8. In a fluid meter, a piston, pivotal support therefor, said piston being mounted eccentrically of the pivot, and means whereby the piston may be moved towards and from the pivot.

9. In a fluid meter, a casing provided with an inlet thereto and an outlet therefrom, fluid measuring means actuated by the fluid flow, said means comprising a plurality of pivots relatively revoluble about each other and adjustable relatively to each other to vary the action of the measuring means.

10. In a fluid meter, a piston and a pivotal mounting for said piston comprising a pivot about which the piston oscillates, a second pivot spaced from the first about which the piston revolves through an orbital path, and means for adjusting the relation of the pivots to each other.

11. In a fluid meter, a meter casing, a piston, and a pivotal mounting for said piston comprising a pivot about which the piston oscillates, a second pivot fixed relatively to said casing and spaced from the first about which the piston revolves through an orbital path, and means for adjusting the relative spacing of said pivots.

12. In a fluid meter, a piston and a pivotal mounting for said piston comprising a fixed pivot, a member rotatably mounted on the fixed pivot, a second pivot engaged by the member, the member being slotted between the two pivots, and means to cause the portions of the member upon opposite sides of the slots to move toward or from each other for varying the distance between the said pivots.

13. In a fluid meter, a casing provided with an inlet thereto, and an outlet therefrom, a fixed pivot, and a bearing mounted on said pivot for rotation, said bearing member having operative relation to said piston and a portion arranged to function as a counterweight to said piston.

14. In a fluid meter, a casing provided with an inlet thereto, and an outlet therefrom, a pivot and a bearing member mounted on said pivot for rotation, said bearing member having operative connection with said piston and a portion arranged to function as a counterweight to said piston, the several parts being so constructed and arranged that a median line passing through said connection and said counterweighted portion also passes through said pivot.

15. In a fluid meter, a casing provided with an inlet and an outlet, a piston chamber, a bearing member pivoted therein, a piston pivotally supported by said bearing member, and an element driven by the piston, said bearing member being counterweighted to compensate for the weight of said piston.

16. In a fluid meter, an outer casing or shell having inlet and outlet portions, intermediate indicator driving mechanism, and an inner casing or shell between said inlet and outlet portions including a supporting member and a cover therefor, comprising a piston chamber, formed of sheet metal, a piston movable therein, a support for said piston, and inner cylindrical members comprising chambers for said piston support and intermediate driving mechanism also formed of sheet metal, the said several sheet metal sections being connected together.

17. In a liquid meter wherein an annular measuring chamber is provided with a hollow cylindrical piston having an eccentric movement combined with a movement of oscillation within said chamber, a bearing block mounted for concentric rotation relatively to said chamber, and an eccentric bearing on said block for said piston, the bearing block having an adjustable portion supporting the eccentric bearing whereby said bearing may be adjusted toward and from the center of said bearing block.

18. In a fluid meter, a piston and a pivotal mounting for said piston comprising a bearing block having bearing recesses in its upper and lower ends, a fixed post extending loosely into the recess in the lower end of said block, a jewel bearing surface at the top of said post, a stud carried by said block and tapered to provide a point bearing for engaging said jewel surface to support said block, a second post carried by said piston and extending loosely into the recess in the upper end of said bearing block, a jewel bearing surface at the lower end of said post and a stud carried by said block and tapered to provide a point bearing for engaging said jewel surface to support said piston.

In testimony whereof I have hereunto signed my name.

RICHARD CLINTON BRADLEY.